US007256896B2

(12) United States Patent
Que et al.

(10) Patent No.: US 7,256,896 B2
(45) Date of Patent: Aug. 14, 2007

(54) METHOD FOR VERIFYING SCAN PRECISION OF A LASER MEASUREMENT MACHINE

(75) Inventors: Ling-Hua Que, Guangdong (CN); Zhong-Kui Yuan, Guangdong (CN); Wei Xu, Guangdong (CN); Xiao-Bo Xin, Guangdong (CN); Kuei-Yang Lin, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,319

(22) Filed: Mar. 16, 2006

(65) Prior Publication Data
US 2006/0227443 A1    Oct. 12, 2006

(30) Foreign Application Priority Data
Apr. 12, 2005    (CN) .................... 2005 1 0034147

(51) Int. Cl.
*G01B 11/30* (2006.01)
*G02B 26/08* (2006.01)

(52) U.S. Cl. ............. 356/600; 359/226; 359/900; 356/608

(58) Field of Classification Search ............ None
See application file for complete search history.

(56) References Cited

U.S. PATENT DOCUMENTS

| 3,866,038 | A  * | 2/1975  | Korth ............... 250/236 |
| 6,323,952 | B1 * | 11/2001 | Yomoto et al. ....... 356/600 |
| 2001/0024309 | A1 | 9/2001 | Shim |

* cited by examiner

*Primary Examiner*—James Phan
(74) *Attorney, Agent, or Firm*—Winston Hsu

(57) ABSTRACT

A method for verifying scan precision of a laser measurement machine includes the steps of: preparing a transparent flat, of which the flatness of each plane is regarded as a flatness conventional true value; determining an optimum scanning mode; determining optimum scanning parameters under the optimum scanning mode; scanning the transparent flat under the optimum scanning mode and the optimum scanning parameters for certain times, and obtaining measuring data; calculating a plurality of flatness values using the measuring data; calculating an average value and a standard deviation of the flatness values, and a bias between the average value and the flatness conventional true value; evaluating the repetitiveness of the laser measurement machine according to the standard deviation; and evaluating the veracity of the laser measurement machine according to the bias.

6 Claims, 2 Drawing Sheets

METHOD FOR VERIFYING SCAN PRECISION OF A LASER MEASUREMENT MACHINE

FIELD OF THE INVENTION

The present invention generally relates to methods for verifying measurement precision, and more particularly to a method for verifying scan precision of a laser measurement machine.

DESCRIPTION OF RELATED ART

Product quality has long been one of the most important factors in maintaining a typical manufacturing enterprise's competitiveness. How to improve the quality of products is an important ongoing pursuit of such an enterprise. Therefore, it is essential to verify whether specifications of products meet with user requirements before a batch production. For a BGA (Ball Grid Array), a 3D profile or a transparent part, conventional measure methods are using CCD (Charge Coupled Device) to measure or using a contact scanning probe to process contact measurement.

Today, laser can be found in a broad range of applications within the industry, where it can be used for such things as pointing and measuring. In the manufacturing industry, laser is used to measure the ball cylindricity in bearings by observing the dispersion of a laser beam when reflected on the ball. Another example is to measure the shadow of a steel band by using a laser beam to find out the thickness of the band. More and more industrial processes require or prefer non-contact measurement. Laser measurement provides a new approach to control the production and quality of products. Sensitive materials that are previously considered difficult or even impossible to measure because they are hot, soft, sticky, elastic, sterile or moving fast, can now be measured precisely by using laser measurement. Laser measurement has no influence on the material, and the material has little influence on the measurement. In a sense, laser measurement is more than only an alternative. The rapid response of these non-contact measuring systems ensures their easy integration into production processes and industrial control systems. 100% online quality control can be guaranteed. With the applications of laser measurement technology in measurement field, a great variety of laser measurement machines are manufactured. Before using a certain laser measurement machine to measure objects, users need to verify scan precision of the laser measurement machine, in order to ensure measurement veracity. If the precision doesn't meet with user requirements, the users need to debug the laser measurement machine, and correct it to be acceptable. However, generally, manufacturers only provide users with reference scan precision of laser measurement machines, but don't provide methods for verifying scan precision of the laser measurement machines.

What is needed, therefore, is a method for verifying scan precision of a laser measurement machine, which can confirm the scan precision of the laser measurement machine, in order to provide user dependable measuring results.

SUMMARY OF INVENTION

One embodiment provides a method for verifying scan precision of a laser measurement machine. The laser measurement machine is connected with a computer. The method includes the steps of: (a) preparing a transparent flat, of which the flatness of each plane is regarded as a flatness conventional true value; (b) determining an optimum scanning mode; (c) determining optimum scanning parameters under the optimum scanning mode; (d) scanning the transparent flat under the optimum scanning mode and the optimum scanning parameters for certain times, and obtaining measuring data; (e) calculating a plurality of flatness values using the measuring data; (f) calculating an average value and a standard deviation of the flatness values, and a bias between the average value and the flatness conventional true value; (g) evaluating the repetitiveness of the laser measurement machine according to the standard deviation; and (h) evaluating the veracity of the laser measurement machine according to the bias.

Other objects, advantages and novel features of the embodiments will be drawn from the following detailed description together with the attached drawings, in which:

DETAILED DESCRIPTION

Figure 1:
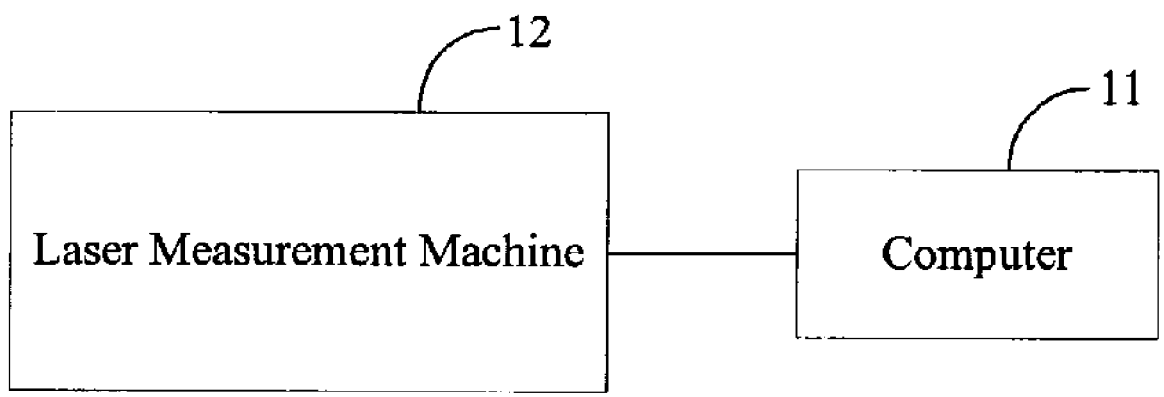
FIG. 1 is a schematic diagram of hardware configuration of a system for verifying scan precision of a laser measurement machine by measuring a transparent part in accordance with a preferred embodiment.

FIG. 1 is a schematic diagram of hardware configuration of a system for verifying scan precision of a laser measurement machine by measuring a transparent part (hereinafter, "the system"), in accordance with a preferred embodiment. The system typically includes a computer 11, and a laser measurement machine 12 for the transparent part to be laid thereon for measurement. The computer 11 is connected with the laser measurement machine 12 via a data bus. The computer 11 is installed with particular software for controlling the laser measurement machine 12 to measure the transparent part. In addition, the computer 11 also stores particular measuring data and calculating data used for verifying scan precision of the laser measurement machine 12.

Figure 2:
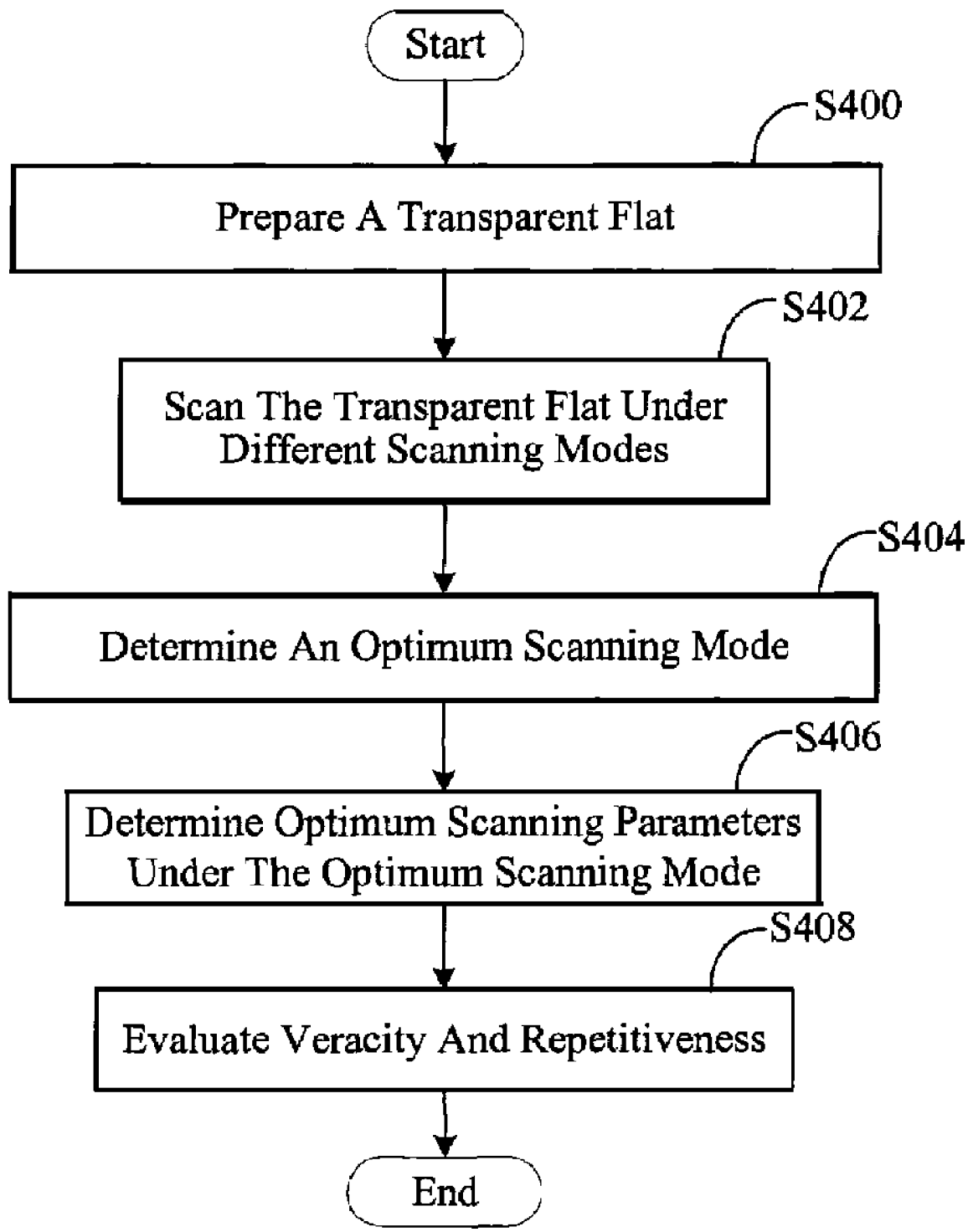
FIG. 2 is a flow chart of a method for verifying scan precision of a laser measure machine by measuring a transparent part in accordance with a preferred embodiment.

FIG. 2 is a flow chart of a method for verifying scan precision of the laser measurement machine 12 by measuring a transparent part. In the preferred embodiment, the transparent part is exampled by a transparent flat. In step S400, the transparent flat is prepared according to particular requirements. The requirements may include that: the diameter of the transparent flat is 45 mm, and the flatness of each plane of the transparent flat is 0.057 μm, which is regarded as a flatness conventional true value when evaluating the scan precision of the laser measurement machine 12. In step S402, the laser measurement machine 12 scans the transparent flat for certain times under each scanning mode. The scanning mode may include Spiral, Circle, Zigzag and Area. The main objective of scanning under different scanning modes is to obtain an optimum scanning mode, in order to scan the transparent flat more accurately. The computer 11 first obtains three-dimension coordinates of scanned points, and calculates the flatness of the transparent flat according to the obtained three-dimension coordinates by executing certain software in the computer 11. In the preferred embodiment, the laser measurement machine 12 scans the transparent flat under each scanning mode for five times. That is, the computer 11 obtains five flatness values under each scanning mode. The computer 11 further calculates an average value and a standard deviation of the five flatness values, and a bias between the average value and the flatness conventional true value.

In step S404, after comparing the standard deviations and the biases under different scanning modes, an optimum scanning mode is determined. In this preferred embodiment, the Spiral scanning mode is the optimum scanning mode since the standard deviation and bias under the Spiral scanning mode is smaller than that of any other scanning mode. In order to determine optimum scanning parameters under the optimum scanning mode, in step S406, the laser measurement machine 12 scans the transparent flat under the Spiral scanning mode by means of changing a scanning parameter and fixing the other scanning parameters. The scanning parameters include sample rate, seek speed, scanning speed and filter factor. An example of determining the optimum scanning speed is provided below. In the preferred embodiment, the scanning speed is set as 50 mm/sec, 30 mm/sec, 10 mm/sec and 3 mm/sec respectively. The laser measurement machine 12 scans the transparent flat at each scanning speed as set forth above for five times. The computer 11 obtains five flatness values at each scanning speed by executing the software in the computer 11, and further calculates an average value and a standard deviation of the five flatness values, and a bias between the average value and the flatness conventional true value. As a result, four average values, four standard deviations and four biases are obtained since there are four scanning speeds. After comparisons of the four average values, the four standard deviations and the four biases, the optimum scanning speed should be equal to or less than 30 mm/sec. The other optimum scanning parameters can be determined in a similar way. By repeating the above described process, it is confirmed that the sample rate and the seek speed have almost no impact on the measuring results, and the filter factor should be in the range of 0.1 kHz and 1 kHz. In step S408, the laser measurement machine 12 scans the transparent flat under the Spiral scanning mode and the optimum scanning parameters for five times. The computer 11 obtains measuring data, and calculates five flatness values using the measuring data by executing the software in the computer 11. Next, the computer 11 calculates an average value and a standard deviation of the five flatness values, and a bias between the average value and the flatness conventional true value. In the preferred embodiment, the standard deviation equals less than 3 µm, and the bias equals about 8 µm. The standard deviation is used for evaluating the repetitiveness of the laser measurement machine 12, and the bias is used for evaluating the veracity of the laser measurement machine 12. Therefore, the veracity of the laser measurement machine 12 is confirmed about 8 µm, and the repetitiveness of the laser measurement machine 12 is confirmed less than 3 µm.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer-based method for verifying scan precision of a laser measurement machine, the method comprising the steps of:
   preparing a transparent flat, of which the flatness of each plane is regarded as a flatness conventional true value;
   determining an optimum scanning mode;
   determining optimum scanning parameters under the optimum scanning mode;
   scanning the transparent flat under the optimum scanning mode and the optimum scanning parameters for certain times, and obtaining measuring data;
   calculating a plurality of flatness values using the measuring data;
   calculating an average value and a standard deviation of the flatness values, and a bias between the average value and the flatness conventional true value;
   evaluating the repetitiveness of the laser measurement machine according to the standard deviation; and
   evaluating the veracity of the laser measurement machine according to the bias.

2. The method according to claim 1, wherein the transparent flat is prepared according to particular requirements, which include that: the diameter of the transparent flat is 45 mm, and the flatness of each plane of the transparent flat is 0.057 µm.

3. The method according to claim 1, wherein the step of determining an optimum scanning mode comprises the steps of:
   scanning the transparent flat under each scanning mode for certain times;
   obtaining a plurality of flatness values under each scanning mode;
   calculating an average value and a standard deviation of the flatness values, and a bias between the average value and the flatness conventional true value;
   comparing the standard deviations and the biases under different scanning modes; and
   determining the optimum scanning mode whose deviation and bias is smaller than that of any other scanning mode.

4. The method according to claim 3, wherein the scanning modes comprise Spiral, Circle, Zigzag and Area.

5. The method according to claim 1, wherein the step of determining optimum scanning parameters under the optimum scanning mode comprises the steps of:
   scanning the transparent flat under the optimum scanning mode by means of changing a scanning parameter and fixing the other scanning parameters for certain times, and obtaining measuring data;
   calculating a plurality of flatness values under the scanning parameter;
   calculating an average value and a standard deviation of the flatness values, and a bias between the average value and the flatness conventional true value;
   determining the optimum parameter of the scanning parameter; and
   repeating the above steps to determine the optimum parameters of the other scanning parameters.

6. The method according to claim 5, wherein the scanning parameters comprise sample rate, seek speed, scanning speed and filter factor.

* * * * *